(12) United States Patent
Denner et al.

(10) Patent No.: US 6,367,885 B1
(45) Date of Patent: Apr. 9, 2002

(54) MOLDED WHEEL AND BEARING ASSEMBLY

(75) Inventors: Thomas E. Denner, Monson; Robert Gosselin, Springfield, both of MA (US)

(73) Assignee: Standex International Corporation, Salem, NH (US)

(*) Notice: Subject to any disclaimer, the term of this patent is extended or adjusted under 35 U.S.C. 154(b) by 0 days.

(21) Appl. No.: 09/591,203

(22) Filed: Jun. 9, 2000

(51) Int. Cl.[7] .............. B60B 3/00; F16C 33/60
(52) U.S. Cl. .............. 301/105.1; 301/64.701; 29/894.361; 384/506; 384/537; 384/546; 264/275
(58) Field of Search .............. 301/5.3, 5.7, 64.7, 301/105.1; 384/504, 505, 506, 537, 544, 546; 29/894.36, 894.361, 894.362; 264/274, 275

(56) References Cited

U.S. PATENT DOCUMENTS

| | | | | |
|---|---|---|---|---|
| 2,731,311 A | * | 1/1956 | Schwartz | |
| 2,955,884 A | * | 10/1960 | Marshall | |
| 3,451,736 A | * | 6/1969 | Riccio | |
| 3,815,959 A | * | 6/1974 | Hill | 301/64.7 |
| 4,072,373 A | * | 2/1978 | Black | |
| 5,518,322 A | * | 5/1996 | Hicks | 384/544 |
| 5,728,343 A | * | 3/1998 | Ueno | 264/275 |
| 5,775,819 A | * | 7/1998 | Kinney et al. | 384/544 |
| 5,833,324 A | * | 11/1998 | Conradsson | 301/5.1 |

* cited by examiner

Primary Examiner—Russell D. Stormer
(74) Attorney, Agent, or Firm—William B. Ritchie

(57) ABSTRACT

A molded wheel and bearing assembly includes two butt-out bearings in a molded housing forming a bearing assembly. The bearing assembly is molded into the hub of a caster wheel. The caster wheel is made by molding a hub around the bearing assembly, then molding a tread around the hub. No assembly of individual elements into the wheel is necessary.

18 Claims, 4 Drawing Sheets

MOLDED WHEEL AND BEARING ASSEMBLY

BACKGROUND OF THE INVENTION

1. Field of the Invention

This invention relates to the field of wheels and, in particular, to caster wheels.

2. Description of the Prior Art

For many years, most high quality wheels for casters such as shopping carts have utilized bearings that include a pair of steel races and steel ball bearings, where each piece is assembled separately into the wheel. Because each part of this bearing assembly is assembled separately, the system relies on the precision of the interlocking structural parts to control the tightness of the bearing. Due to the inherent problems of mass-producing caster wheels with such precision, this method of production results in many caster wheels having less than the required tolerances to ensure a consistent smooth operation. This characteristic can frequently cause the well known "wobble wheel". Additionally, the cost and inefficiency in manufacturing the assembly is high, and thereby translates to higher consumer pricing.

High strength polymer resin compounds have been used extensively for making wheels. More recently, the use of bearing components that molded in the hubs of such wheels has been suggested to absorb shock loads and to lower the cost of the wheel and bearing assemblies. But these assemblies are still complex to manufacture since the bearing parts must still be accurately placed within the mold. To ensure precision of the molded in bearing, the wheel hub must be precisely formed as well.

Representative of this method is U.S. Pat. No. 5,871,286 issued Feb. 16, 1999, which discloses a molded wheel having a bearing assembly molded into the wheel hub. The device includes a synthetic resin outer bearing race element embedded in the hub of the molded wheel and having a cylindrical inner sliding, journal type bearing surface. An inner bearing assembly includes two molded synthetic resin bearing halves having continuous cylindrical outer bearing surfaces disposed within the outer bearing race in sliding engagement with the inner bearing surface of the outer race. The bearing halves of the inner bearing assembly abut each other at their inner ends and may include interlocking structural features at their inner ends that enable securing of the bearing halves together at their inner ends while presenting a continuous outer cylindrical bearing sliding surface that cooperates with the adjacent surface of the outer race. A wheel axle extends through the inner bearing assembly and supports the wheel and bearing assembly for rotation relative to a wheel support.

Although the above invention overcomes some disadvantages of wheel bearings, there are still many disadvantages. First, the outer race is the only bearing element molded into the wheel hub. This leaves the bearing susceptible to the "wobble wheel" phenomenon due to uncontrollable looseness. This effect translates to bearing assemblies having inconsistent tolerances. Second, although this invention attempts to control potential looseness using an interlocking structure between the bearing halves, this means will suffer natural mechanical wear and tear resulting in the "wobble wheel" effect. Finally, although the process of making this invention lowers the cost of wheel and bearing assemblies, only the outer race is added to the wheel at the time of molding and the remainder of the bearing must be assembled at a later time, increasing the overall cost.

Therefore, there is a need for a molded wheel and bearing assembly and method of making the same, wherein the molded wheel can use a pre-assembled bearing assembly having high tolerances such that the tolerances of the molded wheel itself does not substantial adversely effect the overall performance of the finished wheel and, wherein the wheel can be incorporated into a caster support or other support well known in the art and, wherein the wheel can be produced faster and less expensively that wheels made using present manufacturing techniques.

SUMMARY OF THE INVENTION

Therefore, it is an aspect of the present invention to provide a molded wheel that can be produced less expensively than using present wheel construction methods.

It is another aspect of the invention to provide a molded wheel that is made using pre-assembled bearings having high tolerances.

Another aspect of the invention is to provide a molded wheel that uses butt out type bearing as the pre-assembled bearings.

Still another aspect of the invention is to provide a method of making a molded wheel using an easily fabricated housing to hold the pre-assembled bearings wherein the housing can be molded to high tolerances.

It is a further aspect of this invention to provide a simple method of molding a bearing assembly into a wheel suitable for use in a caster.

Another aspect of the invention is to provide a method of making a molded wheel that eliminates much of the assembly costs.

It is still another aspect of the invention to provide a method of making a molded wheel such that the hub of the wheel can be inexpensively molded yet the molded wheel will have high precision to ensure smooth operating of the wheel bearing assemblies.

Another aspect of the invention is to provide a method of making a molded wheel such that molding the hub can be accomplished with having substantially less scrap using prior art techniques.

It is still another aspect of the invention to provide a method of making a molded wheel where the need for much of the assembly equipment such as the machinery for making the bearing, assembly of the bearings into the hub, etc. can be eliminated.

Finally, it is an aspect of the invention to provide a method of making a molded wheel that can accomplished in a two step process and wherein the finished wheel is obtainable off the assembly line after the completion of the second step in the process.

The present invention provides a bearing assembly molded into a wheel. The bearing assembly includes two butt-out precision bearings, which are commercially available, and a molded housing, which can be easily manufactured. One bearing is positioned in each end of the housing. The complete bearing assembly is located in the center of the wheel surrounded by a molded hub. The molded tread is then placed on the molded hub to complete the wheel. The wheel can then be part of caster or other support structure.

The invention also provides a method of making a molded wheel and bearing assembly. A bearing assembly, including two butt-out bearings in a molded housing, is placed in the center of a wheel mold. The hub is molded around the assembly. A tread is then molded around the hub. A completed molded caster wheel can then be removed from the mold. Assembly of individual elements into the wheel is unnecessary.

These aspects of the invention are not meant to be exclusive. Other features, aspects, and advantages of the present invention will be readily apparent to those of ordinary skill in the art when read in conjunction with the following description, appended claims, and accompanying drawings.

DETAILED DESCRIPTION OF THE INVENTION

Figure 1:
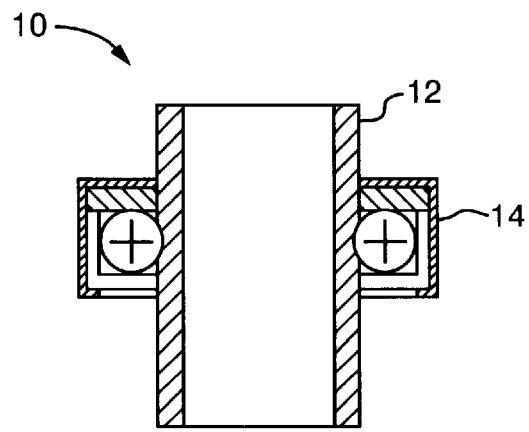
FIG. 1 is a detailed cross-sectional view of typical bearing used in the present invention.

Referring to FIG. 1, an element of the preferred embodiment of the invention is shown. Bearing 10 includes spindle 12 and casing 14. Spindle 12 is hollow and extends through casing 14. Casing 14 includes ball bearings and races to allow spindle 12 to rotate. An axle (not shown) can be inserted through spindle 12 so that completed wheel can be utilized as a caster or in any other similar situation well-known in the art. Bearing 10 is preferably a butt-out type of bearing which is commercially available as pre-assembled unit well known in the art. This type of bearing is available in many different sizes and provides precise fit between the components thus eliminates the need to attempt to precisely assembly the individual bearing parts within the wheel. Further, by utilizing a completed bearing 10, the cost for assembling the bearing is also eliminated.

Figure 2:
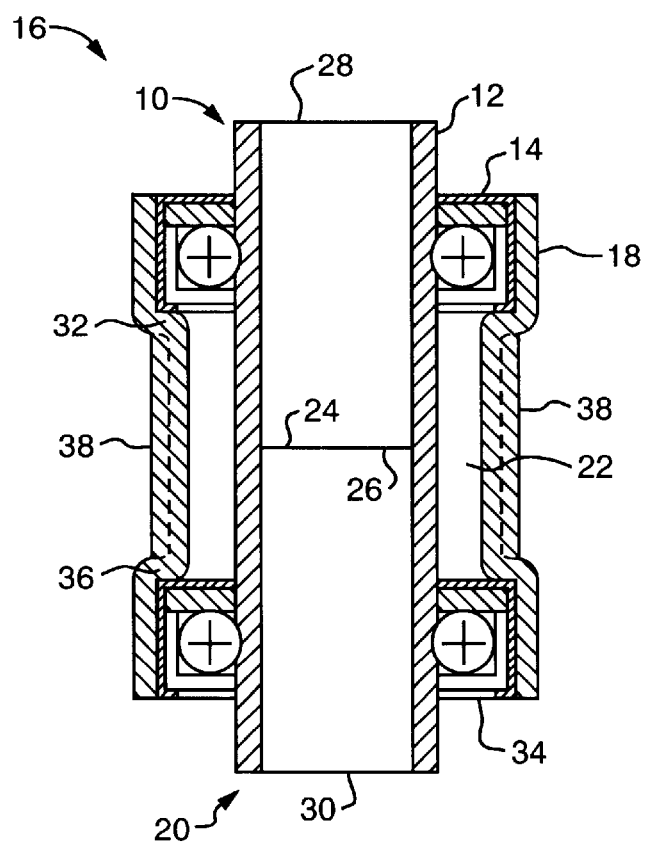
FIG. 2 is a cross-sectional view of the butt-out bearings of FIG. 1 positioned within the molded housing in accordance with the invention.

FIG. 2 is a cross-sectional view of the butt-out bearings 10, 20 positioned within the molded housing 18 in accordance with the invention to form bearing assembly 16. Bearing assembly 16 includes housing 18, bearing 10, and second bearing 20. Bearings 10, 20 are substantially identical to one another when used in a typical caster wheel, however, this is not essential. Some applications might require a longer spindle 12 for the bearings than the other. While butt-out type of precision bearings are used in the preferred embodiment of the invention, this is not critical. Any pre-assembled bearing assembly well known in the art would be suitable. Housing 18 is hollow, open ended, and substantially cylindrical. Housing 18 is preferably made of a moldable plastic, such as DELRIN. However, any plastic such polypropylene, polycarbonate, urethane, etc. could be utilized as long as the plastic can be molded accurately to required tolerances and has sufficient strength to hold press-fitted bearings 10 and 20 in place within housing 18.

As shown in FIG. 2, bearings 10 and 20 fit into interior 22 of the housing. End 24 of bearing 10 and end 26 of bearing 20 abut each other in interior 22 of housing 18. The opposite ends, end 28 on bearing 10 and end 30 on bearing 20, extend through the open ends of housing 18. Casing 14 rests in relief area 32 of the housing, and casing 34 rests in relieved area 36. When fitted to precise dimensions, the casings are held in the relieved areas inside the housing, while the spindles of bearings 10 and 20 are free to rotate.

Housing 18 may also include support ribs 38 along the exterior. Support ribs 38 extend longitudinally along the housing between relieved areas 32 and 36. The use of support ribs 38 provides additional support and further ensures that the bearings are precisely aligned with the housing so that an accurately running wheel is obtained.

Figure 3:
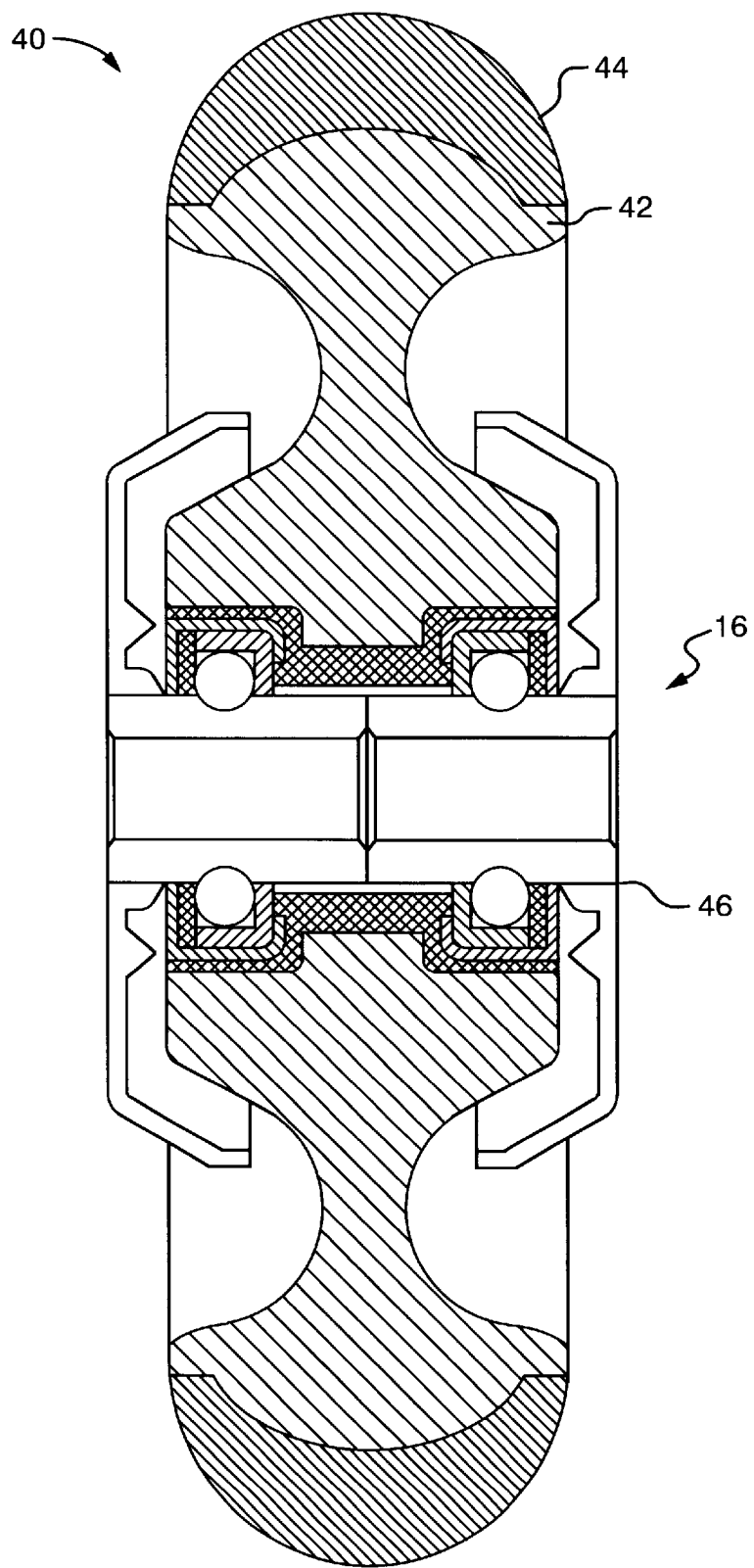
FIG. 3 is a cross-sectional view of the completed wheel with the molded hub and tread in place.

FIG. 3 is a cross-sectional view of the completed wheel 40 with the molded hub 42 and tread 44 in place. This is the preferred embodiment for wheel 40 when used as a caster wheel, especially suitable for use with shopping carts. However, this method of construction can be utilized wherever a mass produced wheel having substantially precise bearings is required. The pre-assembled bearings are available in a variety of sizes and spindles diameters so that wheels of various diameters and axle dimensions can be easily made.

Wheel 40 includes molded hub 42 which molded around bearing assembly 16 and molded tread 44, which is, in turn, molded around hub 42. Hub 42 and tread 44 are molded around the bearing assembly using injection molding techniques that are well known in the art.

Figure 4:
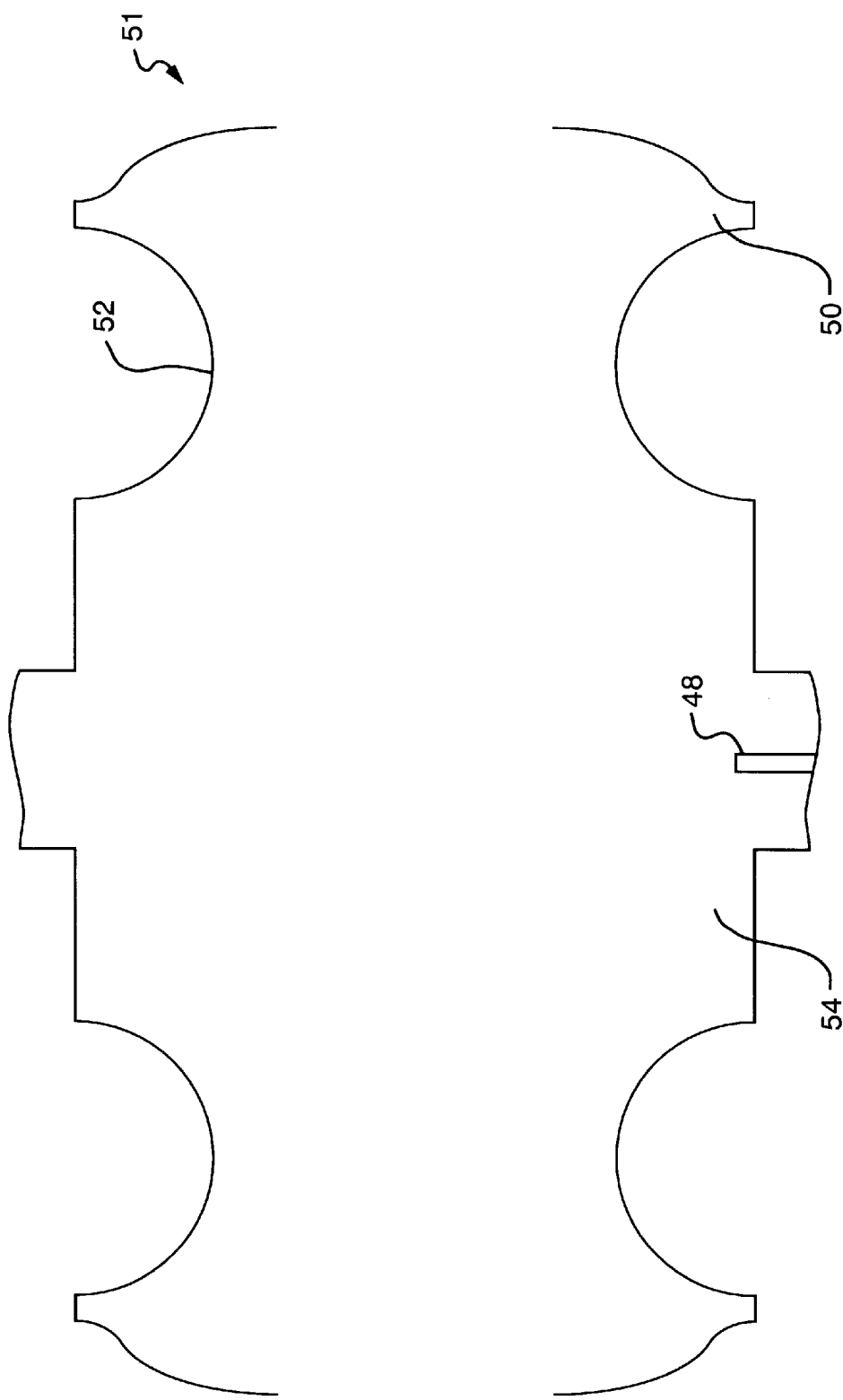
FIG. 4 is a cross-sectional view of the hub mold in which the hub is molded around housing containing the two pre-assembled bearings.

FIG. 4 shows an outline of mold 51 which is used to make wheel 40. Completed bearing assembly 16, including bearings 10 and 20 which have been press fitted into housing 18, are placed in the center of the bottom portion 50 on pin 48 of mold 51. Top section 52 of mold 51 is then placed onto bottom section 50 of mold 51 so that mold 51 is closed and ready for injection of the plastic material to form hub 42. The completed hub 42 with bearing assembly 16 molded therein is then removed and placed into another mold (not shown) wherein tread is then molded around hub 42 containing bearing assembly 16 to form a complete wheel. Those of ordinary skill in the art will appreciate that the molds can be provided so that many wheels are molded simultaneously or so that hub and tread may also be molded during the same process, again using techniques well known in the art.

Figure 5:
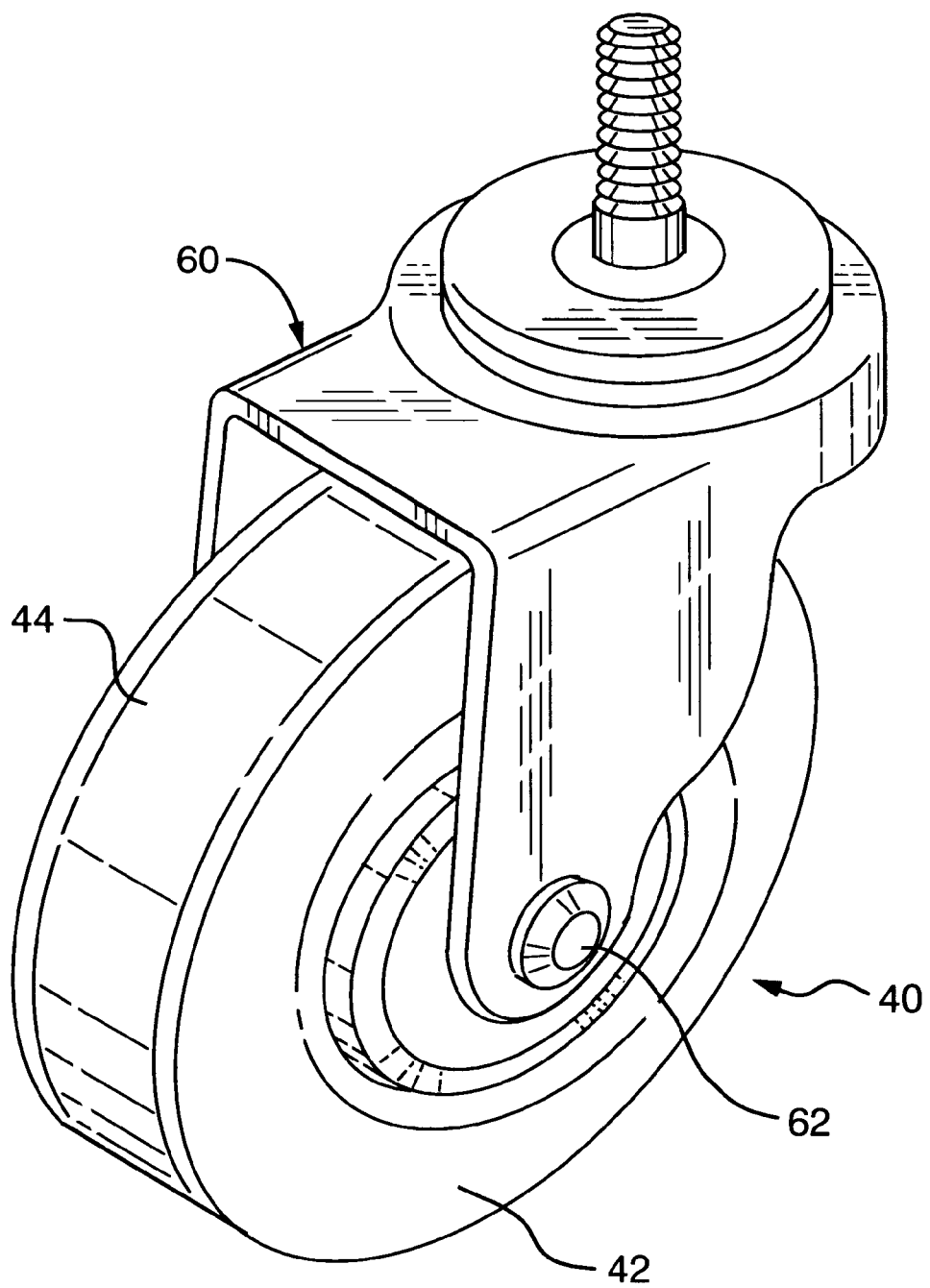
FIG. 5 is an isometric view of the completed wheel in a typical caster mechanism.

As shown in FIG. 5, wheel 40 can be attached in a caster mechanism 60 via axle 62, which is fed through spindles 12 of bearing assemblies 10, 20 (shown in FIGS. 1 and 2).

The illustrated embodiments of the invention are intended to be illustrative only, recognizing that persons having ordinary skill in the art may construct different forms of the invention that fully fall within the scope of the subject matter appearing in the following claims.

What is claimed is:

1. A molded wheel comprising:
    two bearing assemblies, wherein each bearing assembly has a first and second end;
    a molded hollow cylindrical housing with two open ends wherein said housing houses said bearing assemblies, and wherein each said bearing assembly is press-fit into said molded hollow cylindrical housing and wherein said housing being dimensioned to correspond to said bearings assemblies such that said bearing assemblies are aligned with said housing such that the first ends of said bearing assemblies abut one another and such that the second ends of said bearing assemblies are aligned with open ends of said housing;
    a hub and tread assembly which is molded around and substantially encases said housing to form the molded wheel.

2. The wheel as claimed in claim 1, wherein at least one of said bearing assemblies comprise a butt-out type of bearing.

3. The wheel as claimed in claim 1, wherein said bearing assemblies are substantially the same as one another.

4. The wheel as claimed in claim 1 further comprising a caster mechanism so that said wheel can be used as a caster wheel.

5. The wheel as claimed in claim 1, wherein said housing further comprises two relieved areas, wherein said bearings rest against said relieved areas inside said housing.

6. The wheel as claimed in claim 1, wherein said housing further comprises an exterior having a plurality of support ribs.

7. The wheel as claimed in claim 1 wherein said hub and tread assembly has a hub molded from a different material than the tread.

8. The wheel as claimed in claim 1 wherein said hub and tread assembly have a hub and tread molded from essentially the same material.

9. A molded caster wheel comprising:

two bearing assemblies, wherein each bearing assembly has a first and second end and wherein each bearing assembly has a spindle;

a molded hollow cylindrical housing with two open ends wherein said housing houses said bearing assemblies, and wherein said bearing assemblies are press-fit into said molded hollow cylindrical housing and wherein said housing being dimensioned to correspond to said bearing assemblies such that said bearing assemblies are aligned with said housing such that the first ends of said bearing assemblies abut one another and such that the second ends of said bearing assemblies are aligned with open ends of said housing;

a hub and tread assembly which is molded around and substantially encases said housing to form the molded wheel;

an axel dimensioned to fit within the spindles of said bearing assemblies;

a caster mechanism wherein said molded wheel is rotatably attached to said wheel via said axel positioned within the spindles of said bearing assemblies such that said molded caster wheel is provided.

10. A method of making a molded wheel comprising the steps of:

molding a bearing housing;

press-fitting two pre-assembled bearings into the housing to form a wheel bearing assembly;

placing the wheel bearing assembly into a mold;

molding a hub that substantially surrounds the wheel bearing assembly;

then molding a tread that substantially surrounds the hub wherein the wheel is obtained.

11. The method of claim 10 wherein molding the hub and molding of the tread are completed as a single step.

12. The method as claimed in claim 10 wherein said inserting step is accomplished by press fitting the bearings into the housing.

13. The method as claimed in claim 10 wherein the housing is injection molded.

14. The method as claimed in claim 10 wherein the hub and tread assembly is injection molded.

15. The method as claimed in claim 12 where the bearings abut one another when pressed within the housing.

16. The method as claimed in claim 10 wherein said step of placing the bearing assembly into the mold further comprises the step of positioning said bearing assembly on a pin in said mold.

17. The method as claimed in claim 16 wherein the mold has a plurality of pins and wherein the step of placing the bearing assembly on the pin into the mold is repeated such that a bearing assembly is placed upon each pin wherein a plurality of molded wheels are produced in one molding.

18. A method of making a wheel bearing assembly comprising the steps of:

selecting two pre-assembled bearings with each bearing having a spindle and a casing;

molding a housing dimensioned to house said pre-assembled bearings such that the spindles of each bearing are substantially aligned with one another and the casing of said bearings will fit within the housing;

press-fitting said bearings into said housing to form a wheel bearing assembly.

* * * * *